United States Patent
Hirata et al.

(10) Patent No.: US 7,093,011 B2
(45) Date of Patent: Aug. 15, 2006

(54) STORAGE NETWORK SYSTEM, MANAGING APPARATUS, MANAGING METHOD AND PROGRAM

(75) Inventors: Toshiaki Hirata, Kashiwa (JP); Motoaki Hirabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 10/424,883

(22) Filed: Apr. 28, 2003

(65) Prior Publication Data

US 2004/0024870 A1 Feb. 5, 2004

(30) Foreign Application Priority Data

Aug. 1, 2002 (JP) .............................. 2002-224323

(51) Int. Cl.
*G06F 15/173* (2006.01)

(52) U.S. Cl. ..................... 709/223; 709/224; 370/389; 370/397; 370/498

(58) Field of Classification Search ........ 709/223–224, 709/227; 370/389, 396, 397, 498
See application file for complete search history.

(56) References Cited

U.S. PATENT DOCUMENTS

| | | | |
|---|---|---|---|
| 5,257,367 A | | 10/1993 | Goodlander et al. |
| 5,257,374 A | | 10/1993 | Hammer et al. |
| 5,515,376 A | * | 5/1996 | Murthy et al. .............. 370/402 |
| 5,973,690 A | | 10/1999 | Ofer et al. |
| 6,009,466 A | * | 12/1999 | Axberg et al. .............. 709/220 |
| 6,041,042 A | * | 3/2000 | Bussiere ..................... 370/245 |
| 6,105,122 A | | 8/2000 | Muller et al. |
| 6,229,538 B1 | | 5/2001 | McIntyre et al. |
| 6,233,236 B1 | | 5/2001 | Nelson et al. |
| 6,233,246 B1 | | 5/2001 | Hareski et al. |
| 6,289,398 B1 | | 9/2001 | Stallmo et al. |
| 6,381,642 B1 | | 4/2002 | O'Donnell et al. |
| 6,483,839 B1 | | 11/2002 | Gemar et al. |
| 6,516,348 B1 | | 2/2003 | MacFarlane et al. |
| 6,545,982 B1 | * | 4/2003 | Murthy et al. .............. 370/245 |
| 6,553,419 B1 | | 4/2003 | Ram |
| 6,584,499 B1 | | 6/2003 | Jantz et al. |
| 6,664,978 B1 | | 12/2003 | Kekic et al. |
| 6,704,316 B1 | | 3/2004 | He |
| 6,721,862 B1 | | 4/2004 | Grant et al. |

(Continued)

FOREIGN PATENT DOCUMENTS

JP 09-055795 2/1994

(Continued)

OTHER PUBLICATIONS

Masaru Kitsuregawa, Storage Networking, vol. 2 Examples of Storage Networking, EMC Japan Co., Ltd., Storage Networking Industry Association, Jul. 1, 2002, Japan.

(Continued)

*Primary Examiner*—Abio Etienne
*Assistant Examiner*—LaShonda Jacobs
(74) *Attorney, Agent, or Firm*—Mattingly, Stanger, Malur & Brundidge, P.C.

(57) ABSTRACT

A storage network system includes computers, storage systems, connection devices that control connection relations between the computers and the storage system, and a managing device that manages the computers, the storage system and the connection devices. The managing device includes a control section that specifies connection ports of the computers, the storage system and the connection devices that compose the storage network system. Further, the control device of the managing device displays on a display section a data traffic amount at each of the connection ports for each connection path from the computer to the storage system.

27 Claims, 11 Drawing Sheets

U.S. PATENT DOCUMENTS

| | | |
|---|---|---|
| 6,763,380 B1 | 7/2004 | Mayton et al. |
| 6,772,207 B1 | 8/2004 | Dorn et al. |
| 6,839,852 B1 | 1/2005 | Pantuso et al. |
| 6,845,344 B1 | 1/2005 | Lally et al. |
| 6,851,020 B1 | 2/2005 | Matsumoto et al. |
| 6,944,654 B1 | 9/2005 | Murphy et al. |
| 2002/0065938 A1 | 5/2002 | Jungck et al. |
| 2002/0069245 A1 | 6/2002 | Kim |
| 2002/0071398 A1 | 6/2002 | Moran et al. |
| 2002/0107974 A1 | 8/2002 | Janoska et al. |
| 2002/0152305 A1 | 10/2002 | Jackson et al. |
| 2002/0156887 A1 | 10/2002 | Hashimoto |
| 2002/0167955 A1 | 11/2002 | Shimojo |
| 2003/0016686 A1 | 1/2003 | Wynne et al. |
| 2003/0055946 A1 | 3/2003 | Amemiya |
| 2003/0105976 A1 | 6/2003 | Copeland |
| 2003/0135612 A1 | 7/2003 | Huntington et al. |
| 2003/0187945 A1 | 10/2003 | Lubbers et al. |
| 2003/0212785 A1 | 11/2003 | Jibbe |
| 2003/0214962 A1 | 11/2003 | Allaye-Chan et al. |
| 2004/0059822 A1 | 3/2004 | Jiang et al. |
| 2005/0108444 A1 | 5/2005 | Flauaus et al. |

FOREIGN PATENT DOCUMENTS

| | | |
|---|---|---|
| JP | 2000-259702 | 9/2000 |

OTHER PUBLICATIONS

Hseih, J. et al, "Performance of A Mass Storage System for Video-On-Demand", Journal of Parallel and Distributed Computing, Nov. 1995, vol. 30, pp. 147-167.

Chen, J. et al, "A Cascading Neural-Net for Traffic Management of Computer Networks", ACM Annual Computer Science Conference, 1993, pp. 272-277.

vander Merwe, J. et al, "mmdump: A Tool for Monitoring Internet Multimedia Traffic", ACM SIGCOMM Computer Communication Review, Oct. 2000, vol. 30, Issue 5, pp. 48-59.

Jacobson, D. et al, "A Distributed Measurement Technique for an Operating Ethernet Network", (Abstract only), ACM Annual Computer Science Conf., St. Louis, MO, 2000, p. 458.

\* cited by examiner

Fig. 12 (a)

| Node ID | Node Type | Port ID | Port ID at Destination |
|---|---|---|---|
| Computer A | Computer | CA1 | SA1 |
| Computer B | Computer | CA2 | SB1 |
| Switch A | Switch | SA1 | CA1 |
| Switch A | Switch | SA2 | STA1 |
| Switch B | Switch | SB1 | CA2 |
| Switch B | Switch | SB2 | STA1 |
| Switch B | Switch | SB3 | STB1 |
| Storage App. A | Storage Apparatus | STA1 | SA2,SB2 |
| Storage App. A | Storage Apparatus | STA2 | SC2 |
|  |  |  |  |

| Node ID | Port ID | Port Utility Rate (%) |
|---|---|---|
| Computer A | CA2 | 30 |
| Computer B | CB1 | 60 |
| Switch B | SB1 | 30 |
| Switch B | SB2 | 20 |
| Switch B | SC3 | 10 |
| Switch C | SC2 | 45 |
| Storage App. A | STA1 | 25 |
| Storage App. B | STB1 | 10 |
|  |  |  |

| Node ID | Port ID | Physical Disk | Volume |
|---|---|---|---|
| Storage App. A | STA1 | A1,A2 | Volume 1 |
| Storage App. A | STA2 | A1,A2 | Volume 2 |
|  |  |  |  |

1203

STORAGE NETWORK SYSTEM, MANAGING APPARATUS, MANAGING METHOD AND PROGRAM

BACKGROUND OF THE INVENTION

1. Field of the Invention

The present invention relates to a storage managing system, and more particularly to a storage managing system that has a function to assist in identifying bottleneck sections in a storage system.

2. Related Background Art

A conventional storage managing system is capable of indicating connection relations among devices in a storage system on a management monitor screen. Also, the storage managing system is capable of displaying the data traffic amount of each of the devices displayed on the management monitor screen in the unit of connection ports or in the unit of individual devices.

The aforementioned conventional storage managing system does not display on the management monitor screen the data traffic amount of each of the devices in terms of connection relation among the devices in the storage system. Accordingly, when a bottleneck section in the storage system is to be specified, an administrator initially needs to select ports to be referred to on the management monitor screen that displays the connection relations among the devices, and then refer to the data traffic amount of each of the connection ports of the devices on the storage system to locate the bottleneck section. For this reason, it needs an excessively long time and much work for the administrator to specify the bottleneck section.

After having specified the bottleneck in the storage system, the administrator first needs to refer to the management monitor screen that indicates the connection relations among the devices, then refer to the data traffic amount of each of the connection ports of the devices on the storage system, judges himself a new path to be selected to solve the bottleneck, and execute a path switching processing.

SUMMARY OF THE INVENTION

The present invention relates to assisting network administrators in specifying bottleneck sections occurred in a storage system.

The present invention also relates to assisting network administrators in switching paths to solve bottleneck sections in a storage system.

An embodiment of the present invention pertains to a storage network system that includes at least a computer, a storage system, a connection device that controls a connection relation between the computer and the storage system, and a managing device that manages the computer, the storage system and the connection device. The storage network system, and more preferably the managing device may have a control section that specify connection ports of the computer, the storage system and the connection device that compose the storage network system. Further, the control device of the managing device may display on a display section a data traffic amount at each connection port for each connection path from the connection port in the computer to the connection port in the storage system.

In the storage network system in accordance with the embodiment described above, the control section of the managing device may preferably measure the access time from the computer to each of the connection ports of the connection device and/or the storage system and the data traffic amount at each of the connection ports, specify any of the connection ports at which the access time and the data traffic amount are synchronized with each other, and display the data traffic amount of the specified connection port on the display section in a manner distinguishable from the other connection ports.

Furthermore, in accordance with another embodiment of the present invention, the control section of the managing device may preferably measure the access time for each connection path from the connection port in the computer to the connection port in the storage system, and specify connection ports in the computer, the storage system and the connection device on a specified one of the connection paths when the access time on the specified connection path exceeds a specified allowable time range. Also, the control section of the managing device may preferably display the data traffic amount for each of the connection ports on the display section.

In the embodiment described above, when the data traffic amount for any of the connection ports displayed on the display section exceeds a predetermined reference value, the control section of the managing device may preferably judge that the connection port is overloaded, and display on the display section that the connection port is overloaded.

In accordance with another embodiment of the present invention, the control section of the managing device may preferably specify the computer, the storage system or the connection device that compose the storage network system, and display on the display section the data traffic amount for each connection path from the computer to the storage system for each of the computer, the storage system and the connection device.

In accordance with the embodiment described above, the control section of the managing device may preferably judge that the computer, the storage system or the connection device is overloaded when the data traffic amount for each of the computer, the storage system or the connection device displayed on the display section exceeds a predetermined reference value, and may preferably indicate on the display section that the computer, the storage system or the connection device is overloaded.

Furthermore, the control section of the managing device may preferably specify another connection path that is shared by the connection port that is determined to be overloaded, and display on the display section the data traffic amount for each connection port on the other connection path.

Moreover, the control section of the managing device may preferably specify another connection path that is shared by the storage system or the connection device that is determined to be overloaded, and display on the display section the data traffic amount of the computer, the storage system or the connection device on the other connection path.

Also, in the embodiment described above, a connection path between at least two connection devices or a connection path between at least a computer and a storage system may preferably be shared by an access path to a plurality of computers and a plurality of storage systems.

Further, in the embodiment described above, the control section of the managing device may preferably judge, when the data traffic amount at a connection port of the connection device displayed on the display section exceeds a specified reference value, that the connection device is overloaded, generate a control signal for switching paths to eliminate the overload according to the data traffic amount for each connection port, and transmit the control signal through an interface to the connection device or the storage system that composes the storage network system.

Also, in the embodiment described above, the control section of the managing device may preferably judge, when the data traffic amount at a connection port of the storage system displayed on the display section exceeds a specified reference value, that the storage system is overloaded, generate a copy control signal for copying data stored in the storage system onto another storage system to eliminate the overload according to the data traffic amount for each connection port, and transmit the copy control signal through an interface to the storage system or the connection device.

Moreover, the control section of the managing device may preferably generate an access control signal for switching the access from the storage system that is determined to be overloaded to the other storage system that stores the copied data, and transmit the access control signal through an interface to the connection device and the storage system or the connection device.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 12(*a*), 12(*b*) and 12(*c*) show tables of data structures in a managing information database.

DESCRIPTION OF THE PREFERRED EMBODIMENTS

Figure 1:
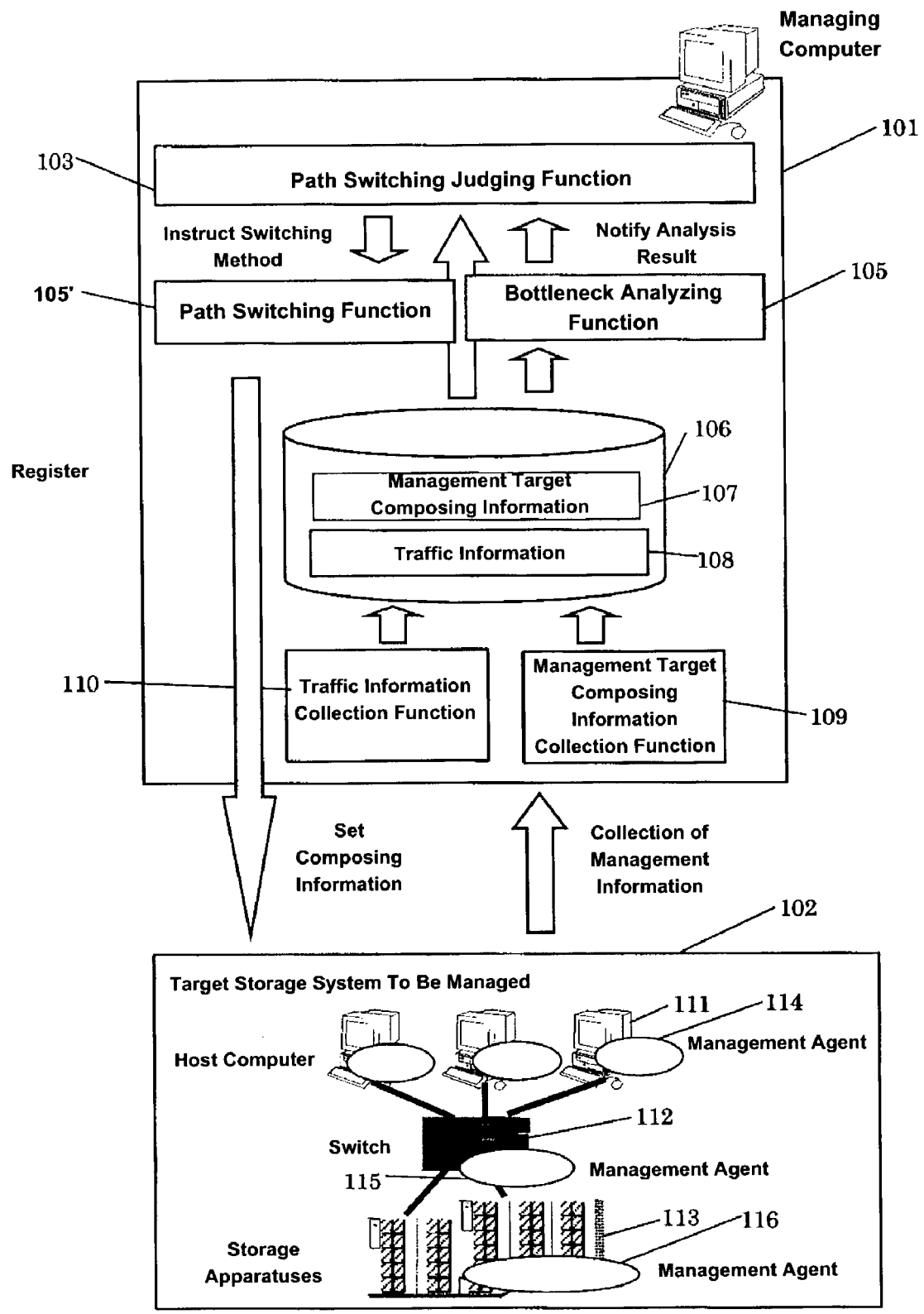
FIG. 1 schematically shows a system structure of a storage managing system.

FIG. 1 shows a system structure of a storage network system in accordance with an embodiment of the present invention.

As indicated in FIG. 1, in the storage network system in accordance with the present embodiment, a managing computer (101) collects management information from a storage system (102) to be managed, and conducts a storage management of the management information. The managing computer (101) also provides setting instructions including switching of access paths to equipments that are to be managed. The managing computer (101) may be composed of a management target composing information collection function (109) that collects information concerning attribute information of each device and connection relation among devices from a target system to be managed, a traffic information collection function (110) that collects information of data traffic amount of each connection port of each equipment, a managing information database 106 that stores and manages the collected management target composing information and traffic information, a bottleneck analyzing function (105) that searches a performance bottleneck section based on the management information, a path switching judging function (103) that sets an appropriate switching method for leveling off the load for the bottleneck section, and a path switching function (105') that instructs target equipments to be managed to switch the paths. The target storage system to be managed is equipped with management agents (114), (115) and (116) at corresponding equipments. Each of the management agents at each equipment responds to requests from the managing computer (101) with management information designated by the managing computer (101) and executes changes of compositions as instructed by the managing computer (101).

Figure 2:
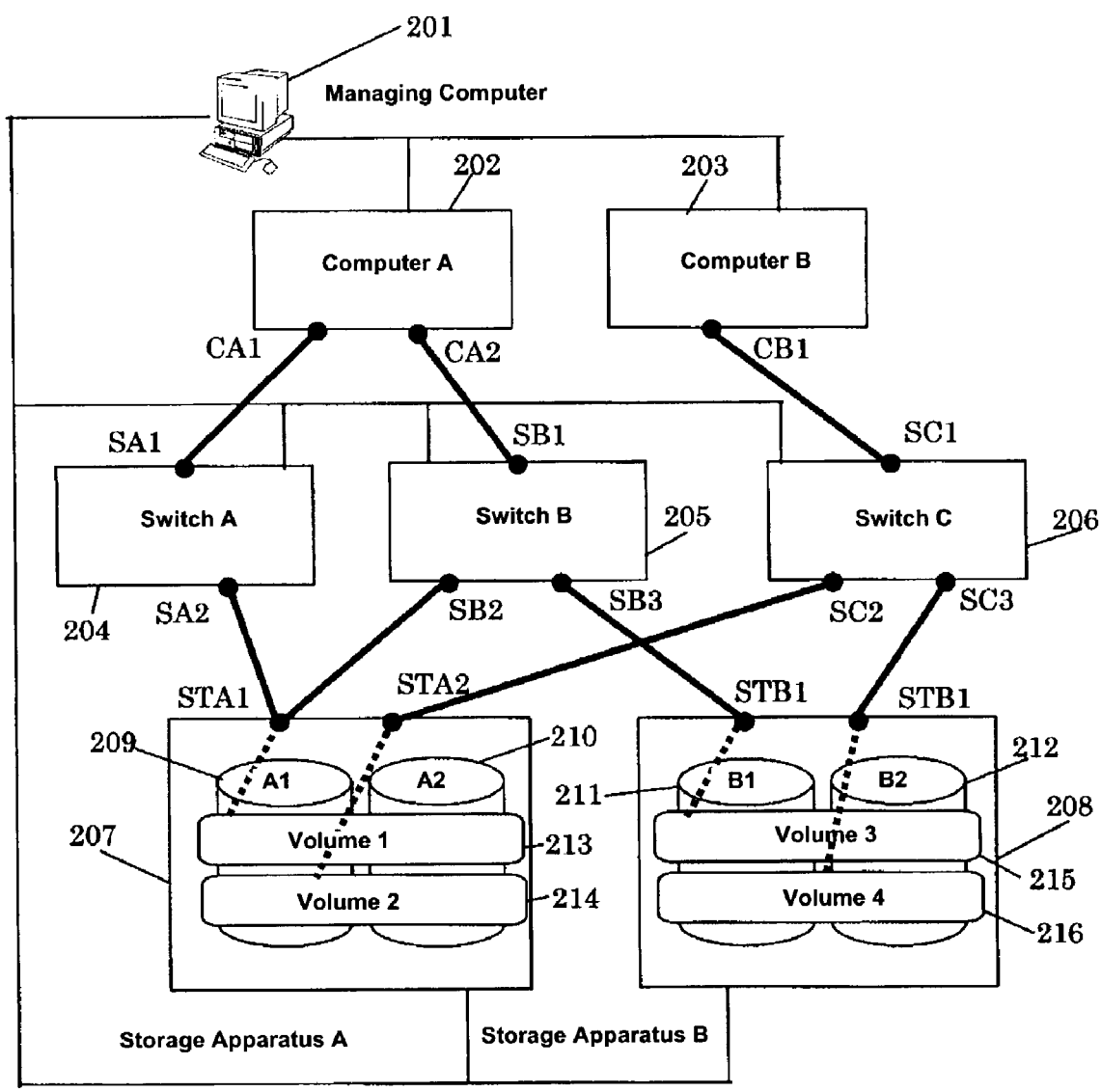
FIG. 2 schematically shows a structure of a storage system.

FIG. 2 shows a system composition of the managing computer (201) and a target storage system to be managed in accordance with one embodiment of the present invention. It is noted that the number of equipments such as computers, switches and the like shown in the drawing may not necessarily limited to those shown in the drawing. The managing computer (201) connects to a computer A (202) and a computer B (203). The computer A (202) includes access ports CA1 and CA2 for accessing to storage apparatuses, and the computer B (203) includes an access port CB1 for accessing to storage apparatuses. A switch A (204) includes an access port SA1 from the computer A, and an access port SA2 to a storage apparatus A (207). A switch B (205) includes an access port SB1 from the computer A, an access port SB2 to the storage apparatus A and an access port SB3 to a storage apparatus B (208). A switch C (206) includes an access port SC1, an access port SC2 to the storage apparatus A and an access port SC3 to the storage apparatus B. The storage apparatus A (207) includes an access port STA1 from the switch A and the switch B, an access port STA2 from the switch C. The storage apparatus B (208) includes an access port STB1 from the switch B and an access port STB2 from the switch C. The storage apparatus A is composed of physical disks A1 (209) and A2 (210), which are assigned volume 1 (213) and volume 2 (214), respectively, that are logical access units as viewed from the computers. The volume 1 (213) and volume 2 (214) are correlated with the access ports STA1 and STA2, respectively. Similarly, the storage apparatus B is composed of physical disks B1 (211) and B2 (212), which are assigned volume 3 (215) and volume 4 (216), respectively, that are logical access units as viewed from the computers. The physical disks B1 (211) and B2 (212) are correlated with the access ports STB1 and STB2, respectively. By the structure described above, accesses can be made from the port CA1 of the computer A through the switch A to the volume 1 on the storage apparatus A; and accesses can be made from the port CA2 of the computer A through the switch B to the volume 1 on the storage apparatus A and through the switch B to the volume 3 on the storage apparatus B. Also, accesses can be made from the port CB1 of the computer B through the switch C to the volume 2 on the storage apparatus A and through the switch C to the volume 4 on the storage apparatus B. The managing computer has communication paths that enable direct communication to all of the equipments. The communication paths are structured such that management information can be collected from equipments in the system and composition settings can be made to the equipments through the communication paths.

Figure 3:
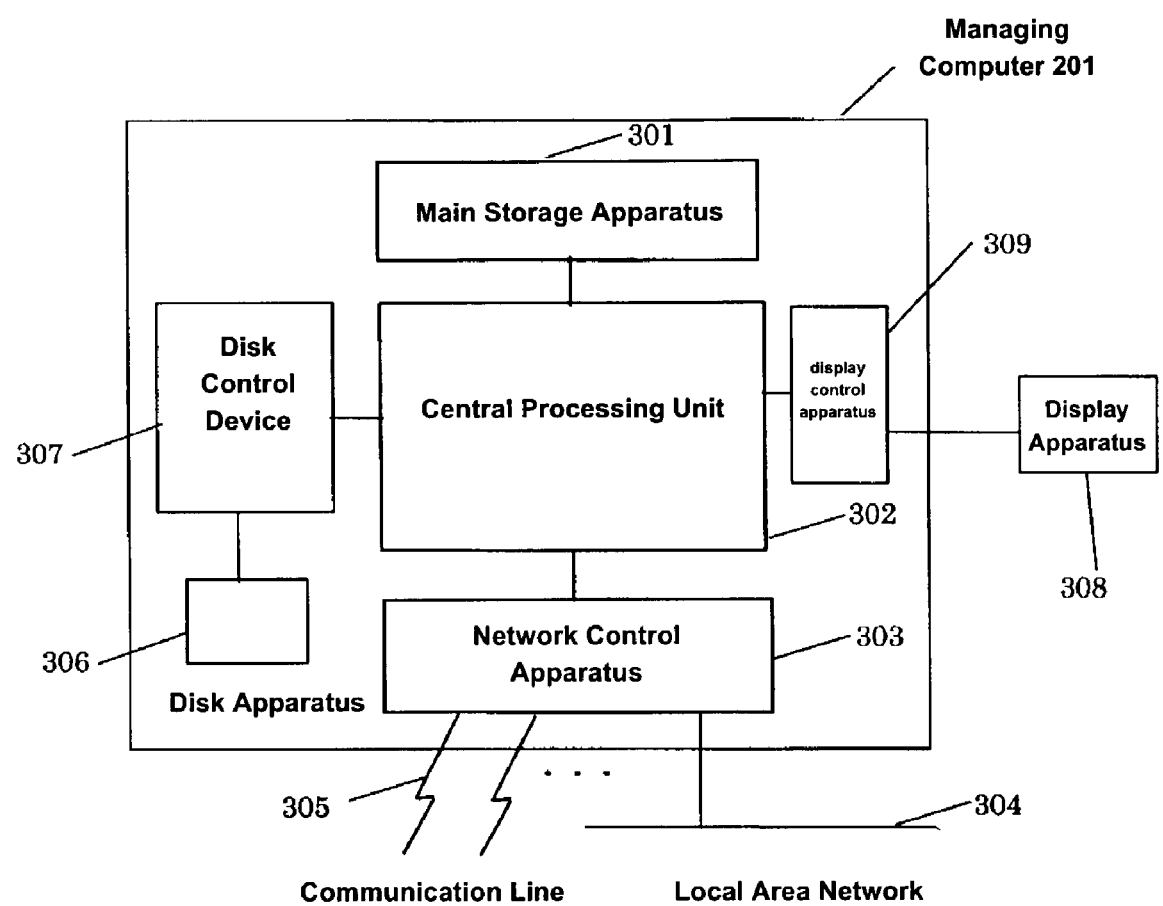
FIG. 3 schematically shows a hardware structure of each computer.

FIG. 3 shows a structure of the managing computer in accordance with an embodiment of the present invention.

The managing computer (201), which may be composed of a computer, is equipped with a central processing unit (302) that executes commands such as operations, a main storage apparatus (301) that stores data necessary for the operations, a network control apparatus (303) that controls input/output of data with a communication line (305) and a local area network (304), a display apparatus (308), and a display control apparatus (309) that controls input/output of data to be displayed by the display apparatus (308).

The central processing unit (302) executes programs loaded on the main storage apparatus (301). Programs that are loaded on the main storage apparatus (301) may be stored in a disk recording apparatus (306) in advance, loaded on the main storage apparatus (301) as necessary, and executed by the central processing unit (302). Alternatively, a portably type storage medium not shown in the drawings, such as, for example, a CD-ROM may be used to store the programs. The programs stored on the storage medium may be read out by a disk recording media reading device that may be portable, which is omitted from the drawings, directly loaded on the main storage apparatus (301) as necessary, and executed by the central processing unit (302). Or, the programs stored on the storage medium may be read out by the disk recording media reading device, installed on the disk recording apparatus (306), loaded on the main storage apparatus (301) as necessary, and executed by the central processing unit (302).

Figure 4:
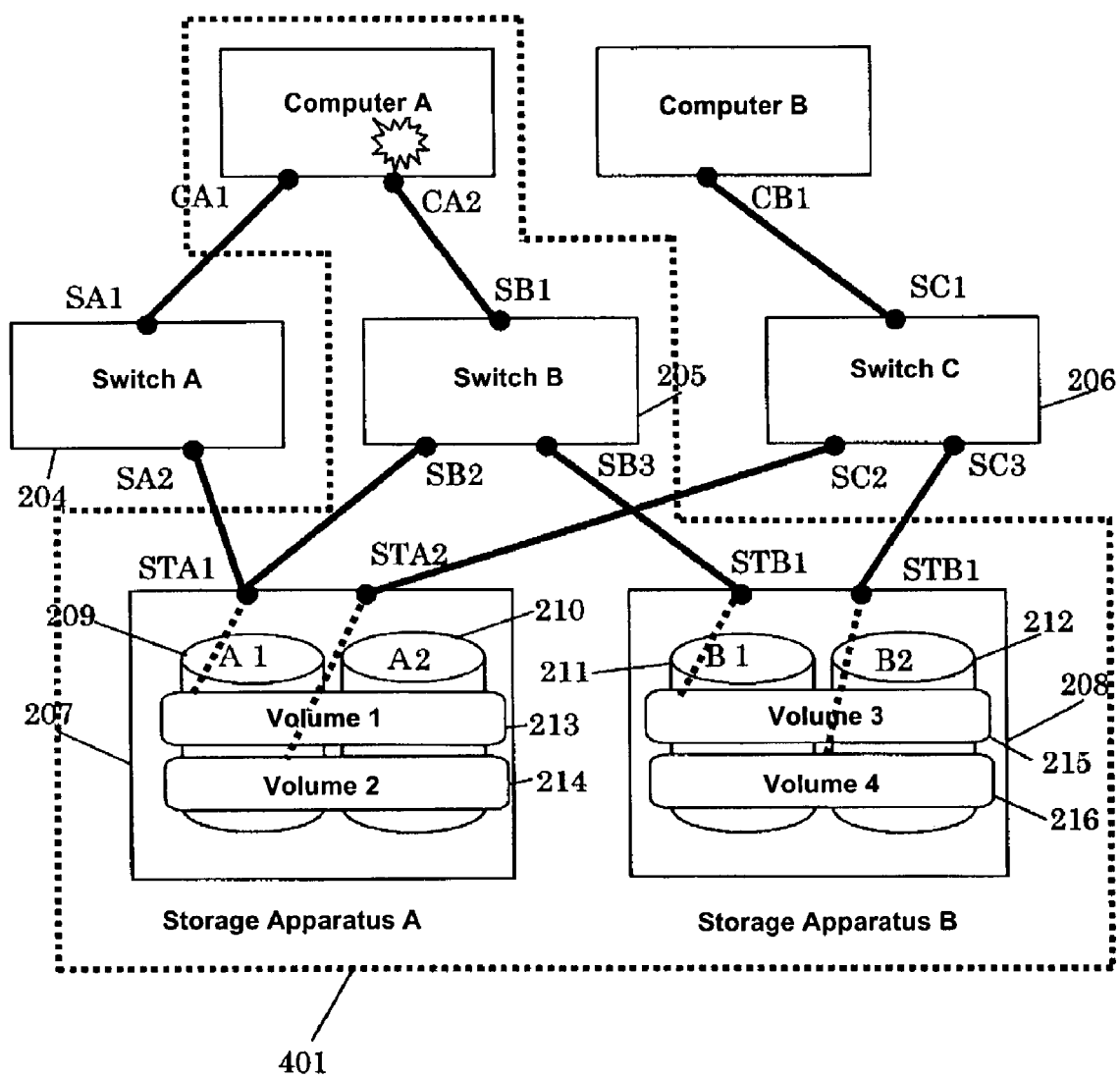
FIG. 4 shows a networking concept of a storage managing system.
Figure 6:
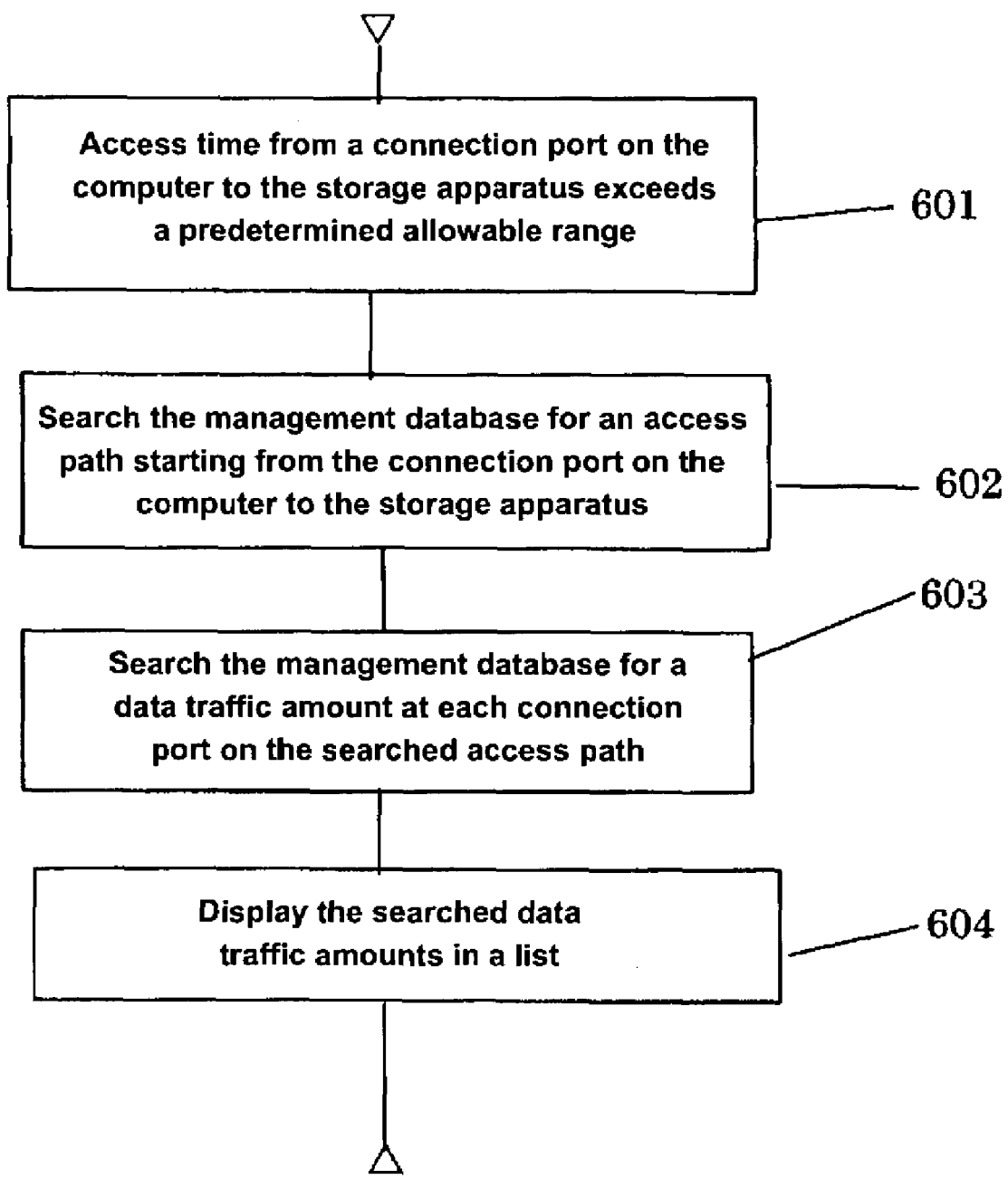
FIG. 6 shows a flowchart of a procedure to search a bottleneck section.

Referring to FIGS. 4 and 6, an analysis procedure performed by the bottleneck analyzing function of the managing computer is described below.

The procedure starts with an event (601) in which, at the port CA2 of the computer A, the access time to the storage apparatuses exceeds a predetermined allowable range. Here, connection ports that can be accessed from the port CA2 at this moment include the ports SB1, SB2 and SB3 of the switch B, the port STA1 of the storage apparatus A, and the port STB1 of the storage apparatus B (which corresponds to an area surrounded by a dotted line in FIG. 4). Also, the port CA2 eventually access the volume 1 on the storage apparatus A and the volume 3 on the storage apparatus B.

Information concerning connecting relation among the apparatuses are collected in advance from the management agents of the respective apparatuses by the management target composing information collection function on the managing computer shown in FIG. 1. The collected information is stored in the management data base and managed, and the bottleneck analyzing function refers to the information when the analysis procedure is executed (602).

Figure 10:
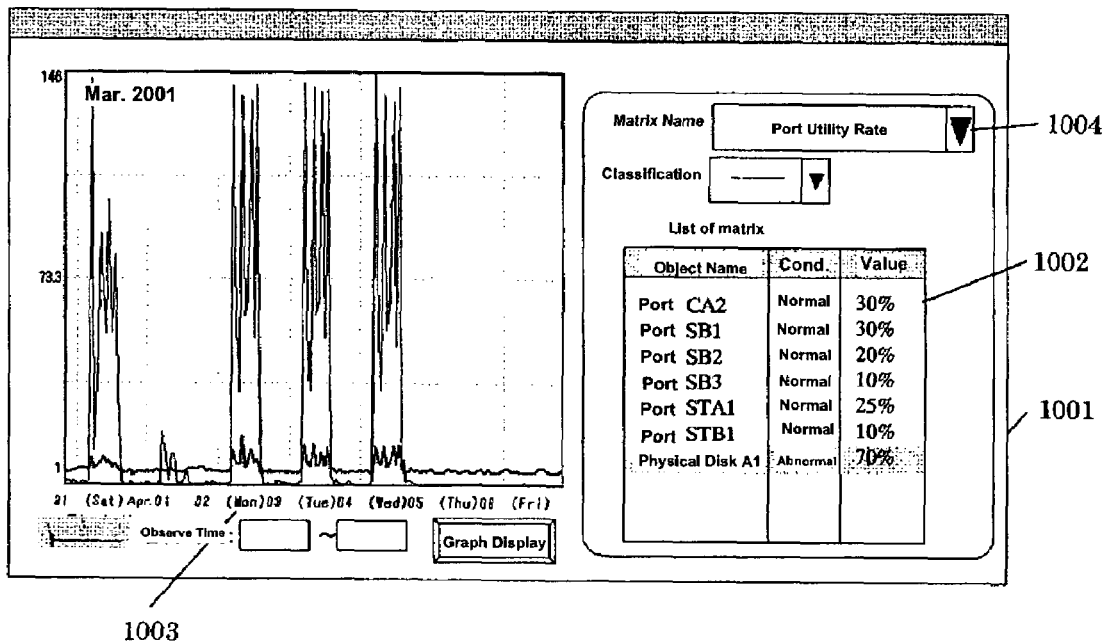
FIG. 10 shows an example of a managing screen image for searching a bottleneck section.

The bottleneck analyzing function refers to the management database, and displays data traffic amounts of the ports listed, and accessing loads to the physical disks within the storage apparatuses in a format shown in FIG. 10, for example, (603) and (604). In the illustrated example shown in FIG. 10, it is understood that there is no problem in the data traffic amount at each port, but accesses are concentrated on the physical disk A1 in the storage apparatus. It is noted that the management target composing information collection function on the managing computer may periodically collect the data traffic amount information and load information from the management agents of the respective apparatuses, and store and manage them on the management database; and the bottleneck analyzing function can refer to them when the analysis procedure is executed.

Figure 5:
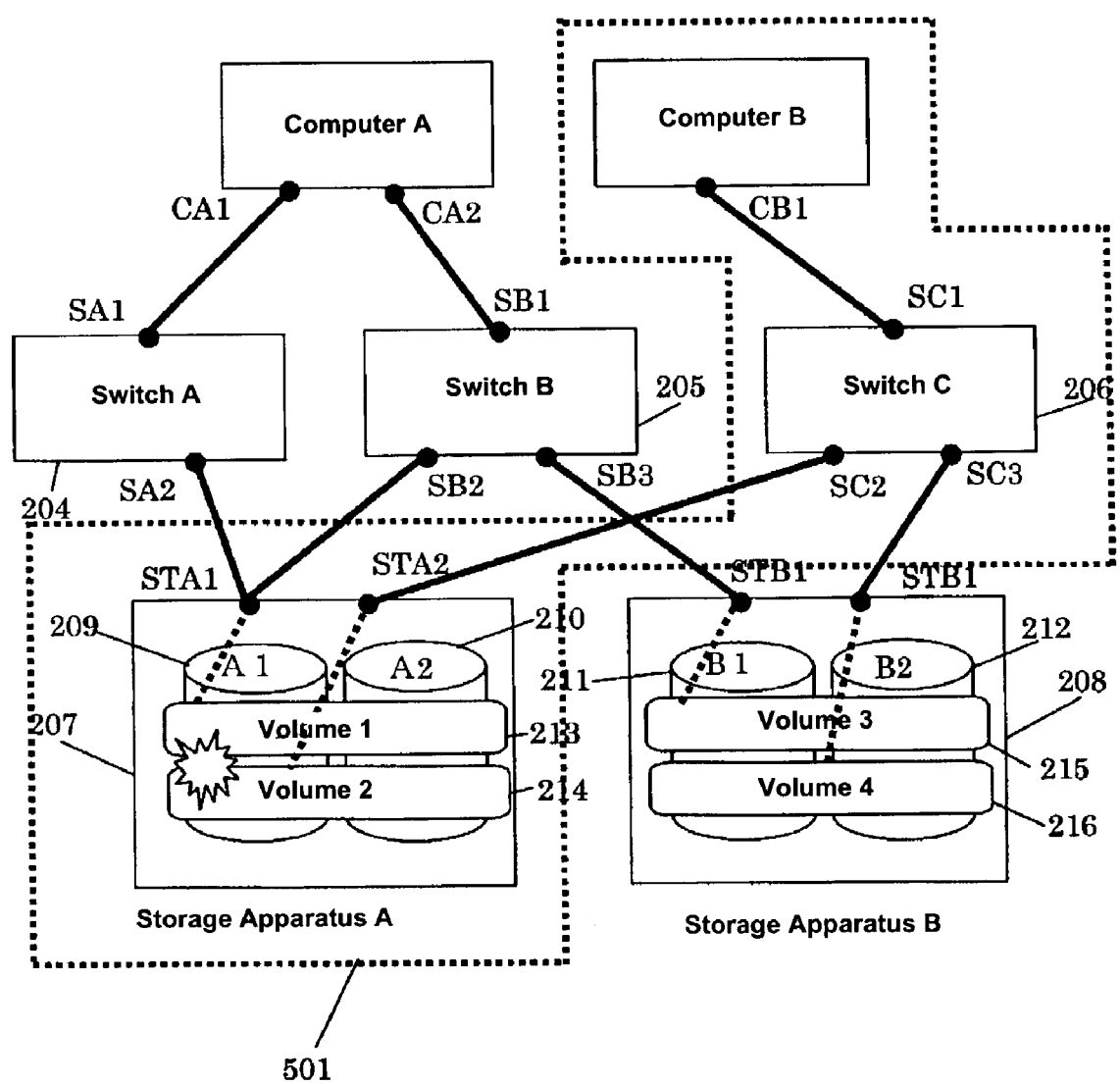
FIG. 5 shows a networking concept of a storage managing system.
Figure 7:
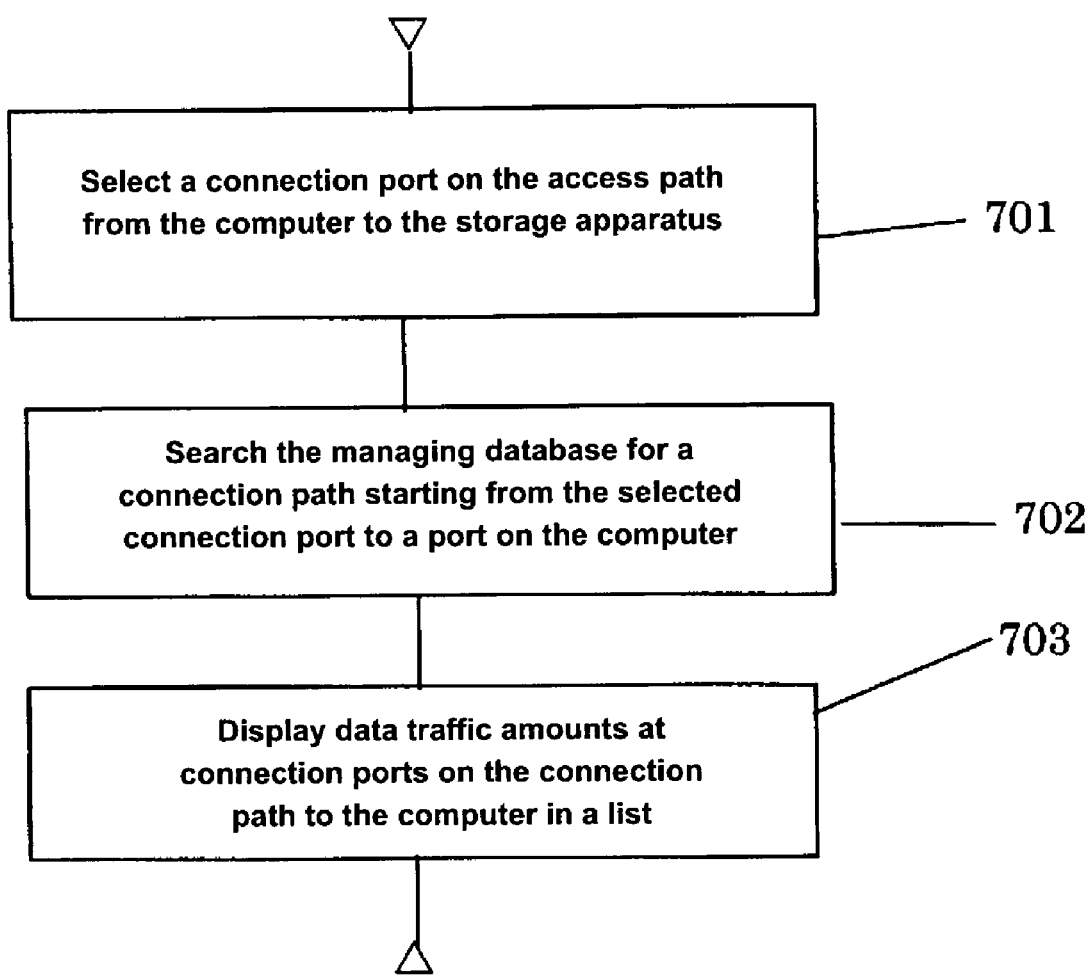
FIG. 7 shows a flowchart of a procedure to search a bottleneck section.

Next, referring to FIGS. 5 and 7, a procedure to search a connection path starting from one of volumes that share the physical disk and leading to a computer that uses these volumes is described.

FIG. 5 shows a state in which the volume 2 is selected as a volume that shares the physical disk A1, and a connection path starting from the access port STA2 to this volume is searched (701) and (702). A port that accesses to the port STA2 is the port SC2 of the switch C, and the port SC2 is accessed from the port CB1 of the computer B through the port SC1 of the switch C (which corresponds to an area surrounded by a dotted line in FIG. 5). In a similar manner to the procedure shown in FIG. 6, the data traffic amount of each of the ports is displayed in a list. An example of the search result is shown in FIG. 10. By this, it is understood that the data traffic from the port CB1 of the computer B is heavy, and this consequently pushes up the access load to the physical disk Al of the storage apparatus A.

Figure 11:
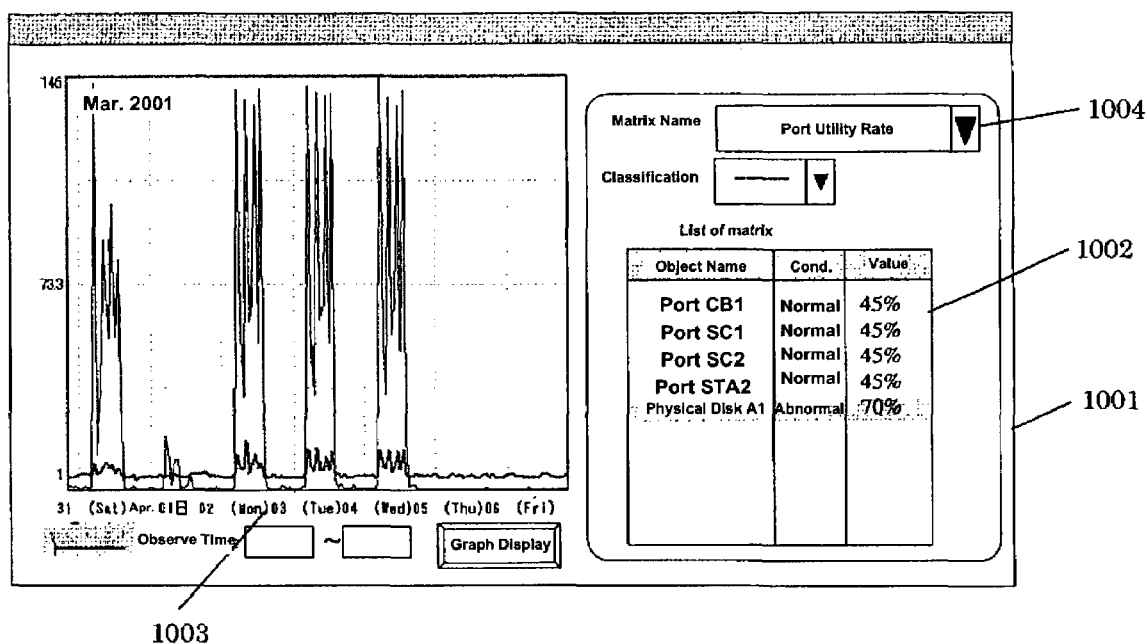
FIG. 11 shows an example of a managing screen image for searching a bottleneck section.

The display monitor screens (1001) displayed by the bottleneck analyzing function in FIGS. 10 and 11 show the data traffics at the respective ports on the connection path in a list (1002), and also show time wise changes of the data traffics in a graph (1003) together with the information of the multiple ports.

FIGS. 12(a), 12(b) and 12(c) show examples of tables of the management database and their data that are used by the bottleneck analyzing function. FIG. 12(a) shows a table (1201) that manages the composition information about target equipments to be managed, which is used to manage information for apparatuses (nodes) and ports on the apparatuses, and destination ports that are connected. Connection relations among the apparatuses can be created based on this information. FIG. 12(b) shows a table (1202) that manages data traffic amounts of the respective ports. The data traffic amounts may be managed by a variety of methods. For example, the data traffic amounts may be managed with values such as past values, average values for a predetermined period of time, or the like. Or, for example, the data traffic amounts may be managed by successively storing values as is that are periodically collected. The graphs displayed in FIG. 10 and FIG. 11 need the latter data management method. FIG. 12(c) shows a table (1203) that manages relations between ports on the storage apparatuses, physical disks and volumes.

As a method for further tracking down a bottleneck factor in the bottleneck analysis procedure indicated in FIG. 6 and FIG. 7, a method that uses synchronization of a matrix can be applied. By utilizing multiple regression analysis, for example, data traffic at a port that has the highest synchronization with changes of access time from the connection port on the computer to the storage apparatus and access loads to the storage apparatus can be listed up in the order of priority.

By applying the bottleneck analysis procedure described above, necessary information can be checked in a table, as compared to a conventional method in which the data traffic at each of the apparatuses is individually checked by an administrator. Accordingly, problems can be more quickly discovered, and the work load to administrators can be alleviated.

Figure 8:
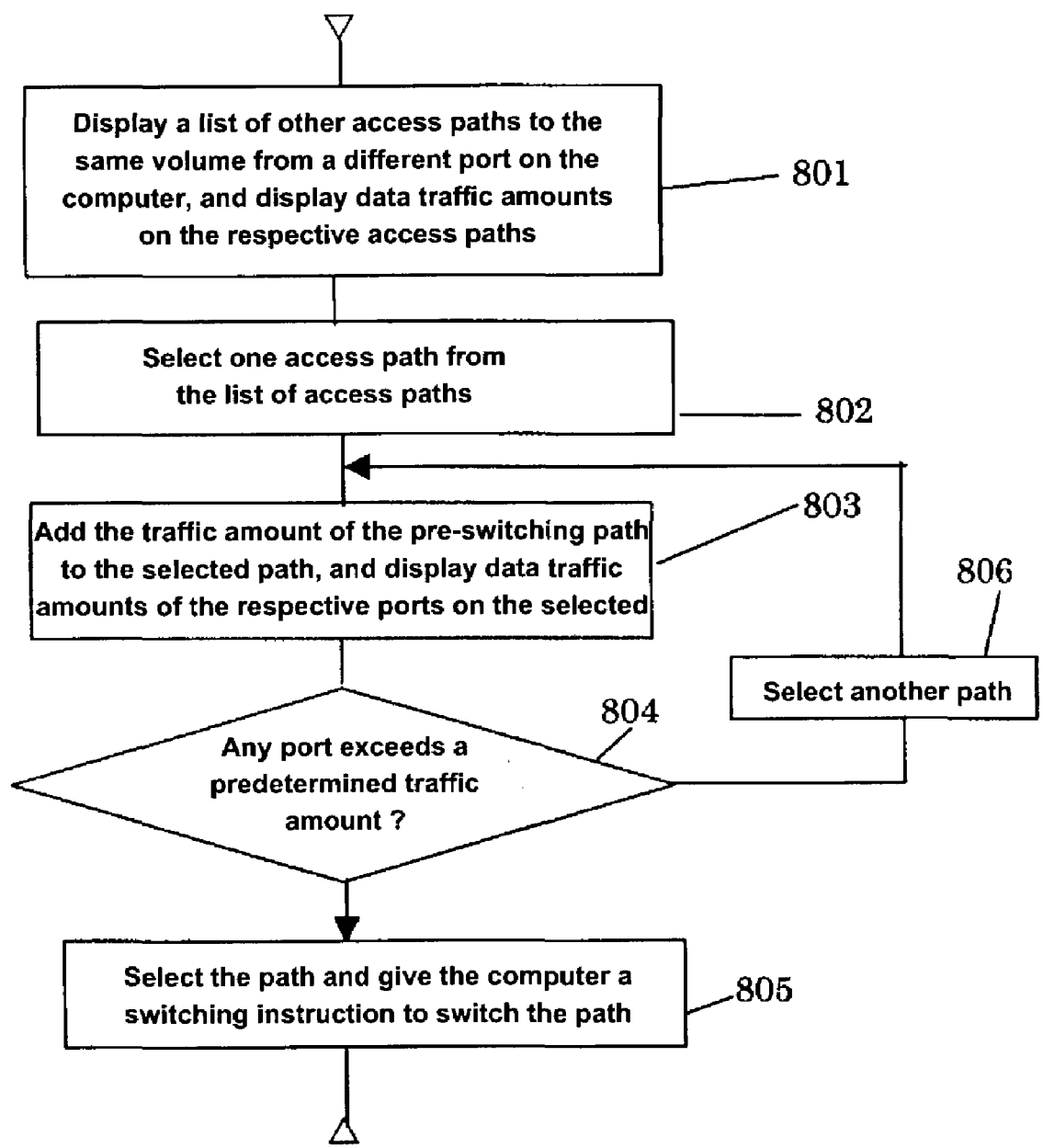
FIG. 8 shows a flowchart of a procedure to switch paths for leveling off the load.
Figure 9:
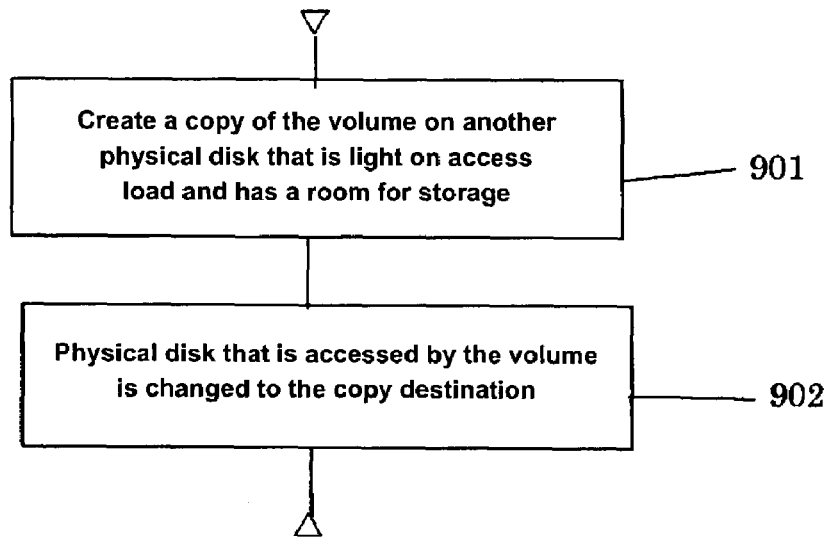
FIG. 9 shows a flowchart of a procedure to switch physical disk volumes for leveling off the load.

Next, an example of a processing procedure of the switching judging function, which is aiming at leveling off the load on the storage system, is described with reference to FIG. 8.

First, when a port on an access path to the storage apparatus is overloaded, the following procedure is performed. The procedure includes displaying a list of the access paths through other switches to the same volume on the storage apparatus from a port on the same computer different from the port whose access time exceeds a predetermined limit, and displaying data traffics on the respective access paths (801).

The administrator refers to the data traffic amounts, and selects one of the access paths from the list of the access paths (802).

The data traffic amount on the access path before switching is added to the one on the selected path, and then data traffic at each of the ports on the access path is displayed (803).

If any of the ports exceeds a predetermined traffic amount, another access path is selected, and the procedure from 803 is repeated. If this does not happen, the access path is selected, and a switching instruction to switch the ports is given through the path switching function of the computer (805). The computer that receives the switching instruction switches the port and can now access to the storage apparatus through an access path corresponding to the switched port. For a zone setting, a switching instruction to a connection apparatus (switches) may be needed.

Next, when the access load to a physical disk on a storage apparatus is becomes excessive, the following procedure is performed.

The path switching judging function instructs the storage apparatus through the path switching function a switching that designates an overloaded volume. A copy of the volume is created on another physical disk that is light on access load and has a room for storage (901).

The physical disk on the storage apparatus that is accessed by the volume is changed to the copy destination (902). In this procedure, the switching can be made without changing the access ports to the storage apparatus as viewed externally. For a zone setting, a switching instruction to a connection apparatus (switches) may be needed.

By using the path switching judging function, the administrator can navigate through switching methods according to the bottleneck section, and can readily take an appropriate procedure, which reduces the work load on the administrator.

In accordance with the present invention, a possible bottleneck section can be automatically pointed out based on the structure of the storage system, and therefore the problem can be quickly found. Also, after a bottleneck section is discovered, an appropriate switching procedure can be readily started according to the bottleneck section, such that the operation load on the storage system can be reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A storage network system comprising:
   a computer;
   a storage system;
   a switch device, coupled to the computer and the storage system, the switch device controlling a data transfer between the computer and the storage system; and
   a management device coupled to the computer, the storage system and the switch device and managing thereof,
   wherein the management device comprises:
   a memory that stores access path information that indicates an access path including a set of connecting ports used by the computer for accessing from the computer to the storage system via the switch device;
   a control section that specifies a first connecting port of the computer, a second connecting port of the switch device and a third connecting port of the storage system, the first, second and third connecting ports being included in the set of connecting ports of the access path, based on the access path information
   a display section coupled to the control section,
   wherein the control section outputs to the display section so that the display section displays data of a traffic amount of the first, second and third connecting ports.

2. A storage network system according to claim 1,
   wherein the access path information includes destination information that indicates a destination storage area in the storage system of the access path,
   wherein the control section specifies the destination storage area based on the destination information, and
   wherein the control section outputs data of a traffic amount of the destination storage area to the display section.

3. A storage network system according to claim 2,
   wherein the control section measures access time for the access path between the computer and the destination storage area of the storage system, and when the access time via the access path exceeds a predetermined permissible time range, the control section outputs to the display section so that display section displays the data of the traffic amount of the first, second and third connecting ports and the destination storage area.

4. A storage network system according to claim 3,
   wherein, when the traffic amount of at least one connecting port of the access path or the destination storage area exceeds a predetermined reference value, the control section judges whether the at least one connecting port or the destination storage area is overloaded, and outputs a signal so that the display section displays the at least one connecting port or the destination storage area that is overloaded.

5. A storage network system according to claim 4,
   wherein the control section specifies a second access path that shares the at least one connecting port or the destination storage area, that is determined to be overloaded, with the access path, and the display section displays data of a traffic amount of connecting ports which are included in the second access path.

6. A storage network system according to claim 2,
   wherein the control section measures access time from the first connecting port of the computer to the second connecting port of the switch device, the third connecting port of the storage system and the destination storage area, specifies at least one connecting port of the access path or the destination storage area at which the access time is in synchronism with the data of the traffic amount of the first, second or third connecting port or the destination storage area, and
   wherein the display section displays data of an access amount at the specified connecting port or the destination storage area in a manner to be discriminated from other of the set of connecting ports and the destination storage area.

7. A storage network system according to claim 6, wherein the control section judges that the switch device is overloaded if the data traffic amount of the second connecting port of the switch device displayed on the display section exceeds a specified reference value, generates a control signal for switching the access path to eliminate the overload according to traffic amount of the set of the connecting ports of the access path and the destination storage device, and transmits the control signal to the switch device.

8. A storage network system according to claim 6, wherein the control section judges that the switch device is overloaded if the traffic amount of the second connecting port of the switch device displayed on the display section exceeds a specified reference value, generates a copy control signal for copying data stored in the destination storage area of the storage system onto an another storage system to eliminate the overload according to traffic amount of the set of the connecting ports of the access path and the destination storage area, and transmits the copy control signal to the storage system.

9. A storage network system according to claim 8, wherein the control section generates an access control signal for switching an access from the destination storage area of the storage system to the other storage system that stores the copied data, and transmits the access control signal to the switch device.

10. A storage network system according to claim 1, wherein the access path information includes destination information that indicates a destination volume in the storage system of the access path,
wherein the control section specifies a disk drive of the destination volume, and
wherein the control section outputs data of a traffic amount of the disk drive of the destination volume to the display section.

11. A managing device that manages a computer, a storage system and a data transfer device, coupled to the computer and the storage system, that controls a data transfer between the computer and the storage system, the managing device comprising:
a memory that stores access path information which indicates an access path, from the computer to the storage system via the data transfer device, which includes connecting ports;
a control section that specifies a first connecting port of the connecting ports of the access path in the computer, a second connecting port of the connecting ports of the access path in the data transfer device and a third connecting port of the connecting ports of the access path in the data transfer device based on the access path information; and
a display section that is controlled by the control section to display data of traffic amount at each of the connecting ports of the access path from the first connecting port in the computer to the third connecting port in the storage system via the second connecting port of the data transfer device.

12. A storage network management method for managing a computer, a storage system and a switch device, coupled to the computer and the storage system, that controls a data transfer between the computer and the storage system, the storage network management method comprising:
storing access path information which indicates an access path used by the computer for accessing from the computer to the storage system via the switch device and including connecting ports;
specifying the access path, a first connecting port of the connecting ports of the access path in the computer, a second connecting port of the connecting ports of the access path in the switch device and a third connecting port of the connecting ports of the access path in the storage system; and
displaying on a display section data of a traffic amount at each of the connecting ports of the access path from the first connecting port in the computer to the third connecting port in the storage system via the second connecting port of the switch device.

13. A program stored on a computer readable medium for executing a storage network management for a computer, a storage network managemnt for a computer, a storage system and a data transfer device, coupled to the computer and the storage system, that controls a data transfer between the computer and the storage system, program comprising:
storing access path information which indicates an access path used by the computer for accessing from the computer to the storage system;
specifying the access path, a first connecting port, which is included in the access path, in the computer, a second connecting port, which is included in the access path, in the data transfer device, a third connecting port, which is included in the access path, in the storage system, and a volume which is a destination of the access path based on the access path information; and
displaying on a display section data of a traffic amount at the first, second and third connecting ports of the access path from the first connecting port in the computer to the third connecting pod in the storage system and data of a traffic amount at the volume.

14. A computer readable medium that stores a program for executing a storage network management for a computer, a storage system and a switch device, coupled to the computer and the storage system, that controls a data transfer between the computer and the storage system, wherein the program stored in the computer readable medium comprises:
specifying a first connecting pod in the computer, a second connecting port in the switch device and a third connecting port in the storage system, the first, second and third connecting ports comprising an access path from the computer to the storage system via the switch device by using the computer; and
displaying on a display section data of a traffic amount at the first, second and third connecting pods of the access path from the first connecting port in the computer to the third connecting port in the storage system.

15. A system comprising:
a computer;
a storage system;
a data transfer device, coupled to the computer and the storage system, the data transfer device controlling a data transfer between the computer and the storage system; and
a management device coupled to and managing the computer, the storage system and the data transfer device, wherein the management device comprises:
a memory that stores access path information that indicates an access path including a set of connecting ports used by the computer for accessing from the computer to the storage system via the data transfer device and a volume, related to a plurality of physical disk drives in the storage system, that is object to access for the computer by using the access path;

a control section that specifies a first connecting port of the computer, a second connecting port of the data transfer device, a third connecting port of the storage system, and a physical disk drive of the plurality of physical disk drives related to the volume based on the access path information, the first, second and third connecting ports being included in the set of connecting ports of the access path; and a display section coupled to the control section, wherein the control section outputs data of a traffic amount of the first, second and third connecting ports and the physical disk drive to the display section.

16. A system according to claim 15, wherein, when the traffic amount of at least one connecting port or the physical disk drive exceeds a predetermined reference value, the control section judges whether the at least one connecting port or the physical disk drive is overloaded, and outputs a signal so that the display section displays the at least one connecting port or the physical disk drive that is overloaded.

17. A system according to claim 16, wherein the control section specifies a second access path that shares the physical disk drive, that is determined to be overloaded, with the access path, and the display section displays data of a traffic amount of connecting ports which are included in the second access path.

18. A system comprising:
a computer;
a storage system;
a switch device, coupled to the computer and the storage system, the switch device controlling a data transfer between the computer and the storage system; and
a management computer coupled to the computer, the storage system and the switch device and managing thereof,
wherein the management computer comprises:
a memory that stores access path information that indicates an access path including a set of connecting ports used by the computer for accessing from the computer to the storage system via the switch device;
a control section that gathers data of a traffic amount of a first connecting port of the computer, a second connecting port of the switch device and a third connecting port of the storage system, the first, second and third connecting ports being included in the set of connecting ports of the access path,
a display section coupled to the control section,
wherein the control section outputs to the display section so that the display section displays the data of the traffic amount of the first, second and third connecting ports.

19. A system according to claim 18,
wherein the access path information includes destination information that indicates a destination storage area in the storage system of the access path,
wherein the control section gathers data of a traffic amount of the destination storage area, and
wherein the control section outputs the data of the traffic amount of the destination storage area to the display section.

20. A system according to claim 19,
wherein the control section measures access time for the access path between the computer and the destination storage area of the storage system, and when the access time via the access path exceeds a predetermined permissible time range, the control section outputs to the display section so that display section displays the data of the traffic amount at the first, second and third connecting ports and the destination storage area.

21. A system according to claim 20, wherein, when the traffic amount of at least one connecting port of the access path or the destination storage area exceeds a predetermined reference value, the control section judges whether the at least one connecting port or the destination storage area is overloaded, and outputs a signal so that the display section displays the at least one connecting port or the destination storage area that is overloaded.

22. A system according to claim 18, wherein the control section specifies a second access path that shares the at least one connecting port or the destination storage area, that is determined to be overloaded, with the access path, and the display section displays data of a traffic amount of connecting ports which are included in the second access path.

23. A system according to claim 21, wherein the control section specifies a second access path that shares the at least one connecting port or the destination storage area, that is determined to be overloaded, with the access path, and the display section displays data of a traffic amount of connecting ports which are included in the second access path.

24. A system according to claim 19, wherein the control section measures access time from the first connecting port of the computer to the second connecting port of the switch device, the third connecting port of the storage system and the destination storage area, specifies at least one connecting port of the access path or the storage area in the set of connecting ports and the destination storage area at which the access time is in synchronism with the data of the traffic amount of the first, second or third connecting port or the destination storage area, and wherein the display section displays data of an access amount at the specified connecting port or the destination storage area in a manner to be discriminated from other of the set of connecting ports and the destination storage area.

25. A system according to claim 24, wherein the control section judges that the switch device is overloaded if the traffic amount of the second connecting port of the switch device displayed on the display section exceeds a specified reference value, generates a copy control signal for copying data stored in the destination storage area of the storage system onto an another storage system to eliminate the overload according to a traffic amount at the set of the connecting ports of the access path and the destination storage device, and transmits the control signal to the switch device.

26. A system according to claim 24, wherein the control section judges that the switch device is overloaded if the traffic amount of the second connecting port of the switch device displayed on the display section exceeds a specified reference value, generates a copy control signal for copying data stored in the destination storage area of the storage system onto an another storage system to eliminate the overload according to a traffic amount at the set of the connecting ports of the access path and the destination storage area, and transmits the copy control signal to the storage system.

27. A system according to claim 26, wherein the control section generates an access control signal for switching an access from the destination storage area of the storage system to the other storage system that stores the copied data, and transmits the access control signal to the switch device.

* * * * *

UNITED STATES PATENT AND TRADEMARK OFFICE
CERTIFICATE OF CORRECTION

PATENT NO. : 7,093,011 B2
APPLICATION NO. : 10/424883
DATED : August 15, 2006
INVENTOR(S) : Toshiaki Hirata and Motoaki Hirabayashi It is certified that error appears in the above-identified patent and that said Letters Patent is hereby corrected as shown below:

Column 10, lines 14- 34, claim 13 should read as follows:

13. A program stored on a computer readable medium for executing a storage network management for a computer, a storage network management for a computer, a storage system and a data transfer device, coupled to the computer and the storage system, that controls a data transfer between the computer and the storage system, program comprising:
    storing access path information which indicates an access path used by the computer for accessing from the computer to the storage system;
    specifying the access path, a first connecting port, which is included in the access path, in the computer, a second connecting port, which is included in the access path, in the data transfer device, a third connecting port, which is included in the access path, in the storage system, and a volume which is a destination of the access path based on the access path information; and
    displaying on a display section data of a traffic amount at the first, second and third connecting ports of the access path from the first connecting port in the computer to the third connecting "pod" --port-- in the storage system and data of a traffic amount at the volume.

Column 10, lines 35-50, claim 14 should read as follows:

14. A computer readable medium that stores a program for executing a storage network management for a computer, a storage system and a switch device, coupled to the computer and the storage system, that controls a data transfer between the computer and the storage system, wherein the program stored in the computer readable medium comprises:
    specifying a first connecting "pod" --port-- in the computer, a second connecting port in the switch device and a third connecting port in the storage system, the first, second and third connecting ports comprising an access path from the computer to the storage system via the switch device by using the computer; and
    displaying on a display section data of a traffic amount at the first, second and third connecting "pods" --ports-- of the access path from the first connecting port in the computer to the third connecting port in the storage system.

Signed and Sealed this
Eighth Day of May, 2012

David J. Kappos
*Director of the United States Patent and Trademark Office*